(12) United States Patent
Liu (10) Patent No.: US 11,616,776 B2
(45) Date of Patent: Mar. 28, 2023

(54) AUTHORITY MANAGEMENT METHOD AND COMPUTING DEVICE UTILIZING METHOD

(71) Applicant: TRIPLE WIN TECHNOLOGY(SHENZHEN) CO. LTD., Shenzhen (CN)

(72) Inventor: Wen-Han Liu, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 448 days.

(21) Appl. No.: 16/906,445

(22) Filed: Jun. 19, 2020

(65) Prior Publication Data

US 2021/0320916 A1 Oct. 14, 2021

(30) Foreign Application Priority Data

Apr. 14, 2020 (CN) .......................... 202010290080.4

(51) Int. Cl.
*H04L 29/06* (2006.01)
*H04L 9/40* (2022.01)
(Continued)

(52) U.S. Cl.
CPC ........ *H04L 63/0861* (2013.01); *G06F 16/532* (2019.01); *G06V 40/168* (2022.01);
(Continued)

(58) Field of Classification Search
None
See application file for complete search history.

(56) References Cited

U.S. PATENT DOCUMENTS

| | | | |
|---|---|---|---|
| 9,027,083 B2* | 5/2015 | Purvis | G06F 21/6218 726/4 |
| 2008/0134296 A1* | 6/2008 | Amitai | H04L 63/102 726/4 |

(Continued)

FOREIGN PATENT DOCUMENTS

| | | |
|---|---|---|
| TW | I329828 B | 9/2010 |
| TW | I469611 B | 1/2015 |

OTHER PUBLICATIONS

Kishore (Aseem Kishore, "How to Set File and Folder Permissions in Windows", Nov. 2015 found at https://www.online-tech-tips.com/computer-tips/set-file-folder-permissions-windows/. (Year: 2015).*

*Primary Examiner* — Piotr Poltorak
(74) *Attorney, Agent, or Firm* — ScienBiziP, P.C.

(57) ABSTRACT

In an authority management method for providing interoperability across different locations and networks, an identity information database and an authority information database are established. Biological image information is obtained from users and registered in the database or an associated database. Biometric image information and an access request of a user are obtained. If there is certain identity information matching the biometric image information of the user in the identity information database, information as to authority and extent of authority are certain identity information queried from the authority information database. The access request is determined to be allowed or not allowed according to the certain authority information. If the access request is to be granted, and allowed in respect of a desired activity, an operation instruction is generated accordingly. A system for administering such method and device applying method are also disclosed.

20 Claims, 4 Drawing Sheets

(51) Int. Cl.
*G06F 16/532* (2019.01)
*G06V 40/16* (2022.01)
*G06V 40/18* (2022.01)

(52) U.S. Cl.
CPC .......... *G06V 40/172* (2022.01); *G06V 40/197* (2022.01); *H04L 63/102* (2013.01)

(56) References Cited

U.S. PATENT DOCUMENTS

2018/0157860 A1* 6/2018 Nair .................... G06F 21/6218
2020/0059703 A1* 2/2020 Sonare ............. H04N 21/23418
2020/0334344 A1* 10/2020 Schwartz ............ H04L 63/0861

* cited by examiner

AUTHORITY MANAGEMENT METHOD AND COMPUTING DEVICE UTILIZING METHOD

FIELD

The subject matter herein generally relates to a technical field of information security, specifically an authority management method, an authority management system, a computing device, and a computer storage medium.

BACKGROUND

Many kinds of electronic devices can be connected to the Internet. This network interconnection has brought great convenience, but information security is a continuing problem. One user needs several different identities or authentications in different places and between different devices before being allowed to access the devices. Existing authority management methods mostly use chip card-based physical authentications or passwords as methods of authentication. Such methods have disadvantages of being easily lost or forgotten, and impose onerous requirements on a user for authentication. The existing authority management methods may also be incompatible among different devices requiring authentication.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Embodiment of Hardware

Figure 1:
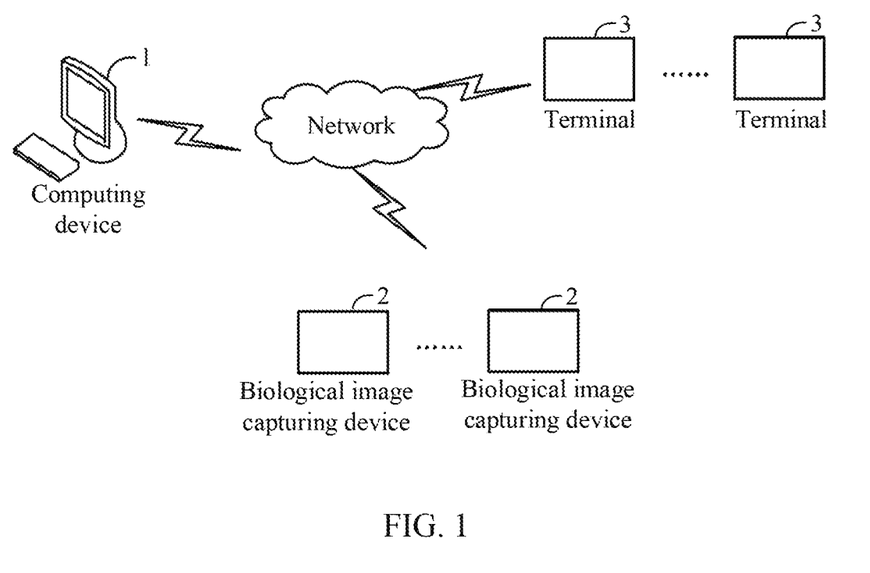
FIG. 1 shows an application of an authority management method provided in one embodiment of the present disclosure.

FIG. 1 shows an application of an authority management method provided in one embodiment of the present disclosure.

The method of the present disclosure may applied to a computing device 1. The computing device 1, at least one biological image capturing device 2, and at least one terminal 3 establish a communication connection through a network. The network may be a wired network or a wireless network, such as radio, WI-FI, 3G, 4G, 5G cellular communication, satellite, broadcasting, etc. The biological image capturing device 2 may be used to acquire biological image information of a user, and send the biological image information to the computing device 1. The terminal 3 may receive an access request input by the user, receive an operation instruction sent by the computing device 1, and perform an operation according to the operation instruction. The computing device 1 may be used to store an identity information database and an authority information database, analyze the biological image information and the access request of the user, and generate the operation instruction.

The computing device 1 may be an electronic device, such as a personal computer or a server, installed with an authority management program. The server may be a single server, a server cluster, or a cloud server.

The biological image capturing device 2 may include, but is not limited to, a facial image capturing device for capturing facial images, and an iris image capturing device for capturing iris images.

The terminal 3 may be an electronic device with arithmetic processing capabilities. The terminal 3 may include, but not limited to, a smart phone, a tablet computer, a laptop portable computer, a desktop computer, a smart wearable device, a smart home device, an access control device, and the like.

Embodiment of Method

Figure 2:
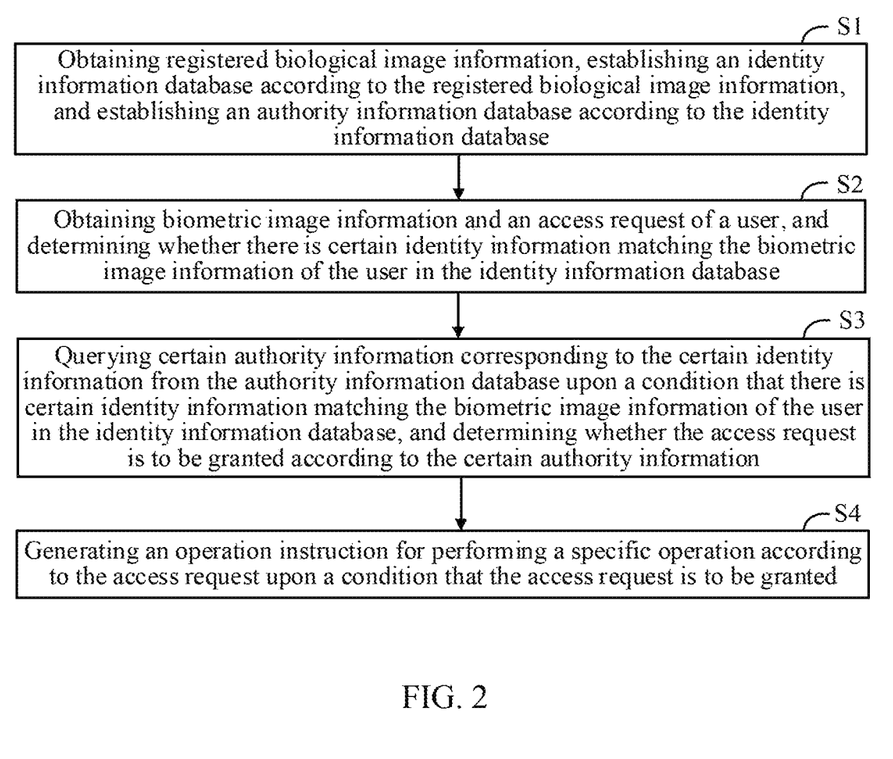
FIG. 2 is a flowchart of the method in one embodiment.

FIG. 2 is a flowchart of the authority management method provided in one embodiment of the present disclosure. The method makes authority management compatible and convenient. According to different requirements, the order of the steps in the flowchart may be changed, and some steps may be omitted.

In block S1, registered biological image information is obtained, an identity information database is established according to the registered biological image information, and an authority information database is established, wherein authority information in the authority information database can be associated with identity information in the identity information database.

The registered biological image information may include facial feature information and/or iris feature information.

Establishing the identity information database may include one or more of the following methods.

A first method of establishing the identity information database may include: obtaining facial images of persons in a preset area from a personal information database, identifying facial feature information of the persons using a facial recognition method, searching identity information of the persons in the personal information database, and storing the identity information corresponding to the facial feature information. The preset area may be a factory, an office building, a community, an industrial area, a city, an entire country, etc. The personal information database may be an employee information database of a factory, a household information database of a community, a resident information database of a city, and the like.

A second method of establishing the identity information database may include: obtaining facial images of persons in a preset area from a personal information database, identifying iris feature information of the persons using an iris recognition method, searching identity information of the persons in the personal information database, and storing the identity information corresponding to the iris feature information.

A third method of establishing the identity information database may include: obtaining facial images of persons in a preset area captured by the facial image capturing device, obtaining registered information of the persons, extracting facial feature information of the persons from the facial images using a facial recognition method, searching identity information of the persons from the registered information, and storing the identity information corresponding to the facial feature information. The facial image capturing device may be a camera or a monitor located at a registration office, or a camera of a mobile phone or a notebook for online registration.

A fourth method of establishing the identity information database may include: obtaining iris images of persons in a preset area captured by the iris image capturing device, obtaining registered information of the persons, extracting iris feature information of the persons from the iris images using an iris recognition method, searching identity information of the persons from the registered information, and storing the identity information corresponding to the iris feature information.

Establishing the authority information database may include: querying authority information of the persons from the identity information database according to the identity information. The authority information may include: hardware authority information, software authority information, access point authority information, and signature authority information. The hardware authority information may include hardware name, allowed functions of hardware, and allowed usage time of hardware. The software authority information may include software name, allowed functions of software, and allowed usage time of software. The access point authority information may include access points (such as hotel lobby and hotel entrance), an allowed access time, etc. The signature authority information may include electronic signature documents, validity periods of electronic signatures, and so on.

Establishing the authority information database may further include: storing the authority information of the persons corresponding to the facial feature information and the iris feature information.

In block S2, biometric image information and an access request of a user are obtained, and whether there is certain identity information matching the biometric image information of the user in the identity information database is determined.

In one embodiment of the present disclosure, the terminal 3 may receive an access request for using the terminal 3, capture an iris image of a user using an iris image capturing device located on the terminal 3, and send the access request and the iris image to the computing device 1. The terminal 3 may be a high-precision measuring device, a high-precision manufacturing device, a high-precision storage device, etc. The computing device 1 may perform some preprocessing to the iris image to obtain iris regions in the iris image. The preprocessing may include one or more of image filtering, edge detection, and interference detection. The computing device 1 may obtain iris feature information according to the iris regions using an iris pattern classification algorithm. The iris pattern classification algorithm may include any one of a classification algorithm based on wavelet transform, a classification algorithm based on discrete cosine transform, and an iris recognition algorithm based on independent component analysis.

In still another embodiment of the present disclosure, the terminal 3 may be a notebook computer. The notebook computer may capture a facial image of a user using a camera, receive, from the user as an administrator, an access request for using the notebook computer as a connection to a network, and send the access request and the facial image to the computing device 1. The computing device 1 may extract facial feature information from the facial image using an artificial intelligence (AI) facial recognition algorithm. The AI facial recognition algorithm may include, but is not limited to, facial recognition algorithms based on deep learnings and neural learning networks.

In yet another embodiment of the present disclosure, the terminal 3 may be a financial terminal, such as a multi-functional financial terminal. The terminal 3 may receive an access request for using the financial terminal from a user, capture a facial image of the user using a built-in camera, capture an iris image of the user using a built-in iris image capturing device, and send the access request, the facial image, and the iris image to the computing device 1. The computing device 1 may extract facial feature information from the facial image using an AI facial recognition algorithm, and iris feature information from the iris image using an iris pattern classification algorithm. The financial terminal may further receive an operation request from the user for performing financial operations on an account. Recognition both of the facial image and the iris image results in a more accurate authentication of the user.

If there is no certain identity information matching the biometric image information of the user in the identity information database, a first prompt message is generated. The first prompt message may inform that the user is illegal. The first prompt message may be one or more of a text message, a voice message, and a warning bell message.

In block S3, certain authority information corresponding to the certain identity information from the authority information database is queried upon a condition that there is the certain identity information matching the biometric image information of the user in the identity information database, and whether the access request is to be granted is determined according to the certain authority information.

The authority information database may store a relationship between biometric information and authority information. According to the relationship between biometric information and authority information, a person with specific biometric information may have authority to access multiple terminals, various software, multiple access points, etc.

Determining whether the access request is to be granted according to the certain authority information may include: querying an allowed access time, allowed access positions, and allowed operations of the user. The allowed access time denotes when a person is authorized to access an object. For example, when at least two persons use a same computer, each person may use the computer for a specific usage time. The usage time of each user may be stored as the allowed access time of the person in the authority information. The allowed access positions denote a position or a location where the person is authorized to access the object. For example, a factory may have different areas, and each worker may be authorized to enter one or more restricted areas. The allowed operations denote which operations the person is authorized to perform, such as operating a device or running a software application.

Determining whether the access request is to be granted according to the certain authority information may further include: determining whether a required access time in the access request is within the allowed access time of the user, determining whether a required access position or location in the access request is within the allowed access positions and locations of the user, and determining whether an intended operation in the access request is within the allowed operations of the user. If the required access time and other limitations in the access request are all in the affirmative, it may be determined that the access request is to be granted. The computing device 1 may compare the required access time with the allowed access time of the user, compare the required access position with the allowed access positions of the user, and compare the required operation with the allowed operations of the user. If at least one of the required access time, the required access position or location, and the required operation in the access request is outside what is allowed, it may be determined that the access request is not to be granted.

If the access request is not to be granted, a second prompt message may be generated. The second prompt message may be used to inform that the user has no authority to perform a specific operation or no authority for one or other activity as being outside of what is allowed. The second prompt message may be one or more of a text message, a voice message, and a warning bell message.

In block S4, an operation instruction is generated for performing a specific operation according to the access request upon a condition that the access request is to be granted.

The operation instruction may be one or more of an unlock instruction for unlocking a door, a startup instruction for starting an application software, a turn-on instruction for turning on an electronic device, a payment instruction for paying a bill, and a signature instruction for signing on an electronic document.

The operation instruction may be sent to the terminal 3 to control the terminal 3 to perform an operation. In one example, the operation instruction is an unlock instruction, the terminal 3 may unlock a door according to the unlock instruction.

In other embodiments of the present disclosure, the authority management method may further include: determining whether there is a related operation associated with the specific operation. If there is a related operation associated with the specific operation, the authority information of the user may be updated in the authority information database to authorize the user to perform such related operation. Whether there is a related operation associated with the specific operation may be determined using a data association algorithm. In one example, when a person opens a safe in a bank, the person may submit a first access request for entering a room storing the safe, and a second access request for unlocking the safe. The second access request may be determined to be associated to the first access request. In another example, a user may submit a third access request for opening a garage door, and a fourth access request for using a car in the garage. The fourth access request may be determined to be associated to the third access request.

FIG. 2 shows the authority management method of the present disclosure in detail. An authority management system 10 and the computing device 1 that implement the authority management method are described below with respect to FIGS. 3-4.

It should be understood that the embodiments are for illustrative purposes only, and are not limited the scope of the present disclosure.

Embodiment of System

Figure 3:
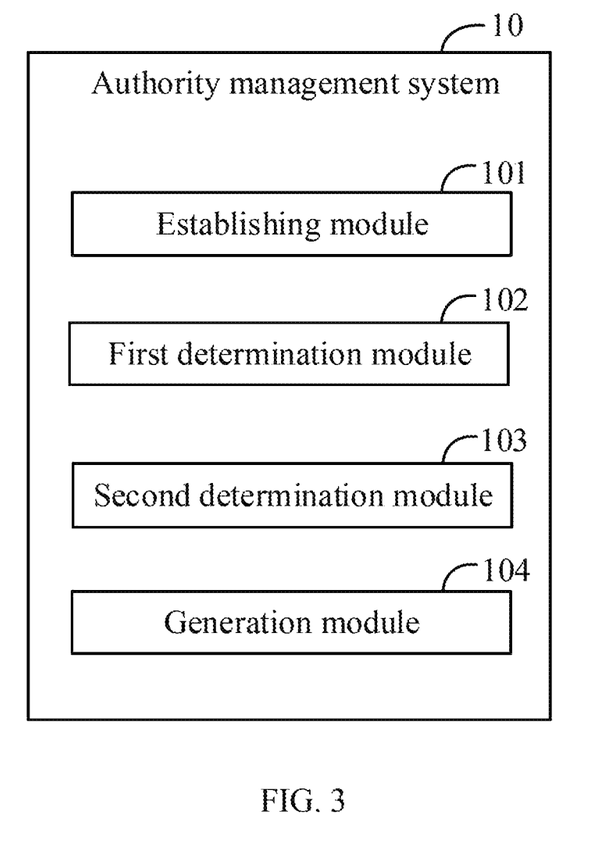
FIG. 3 is a block diagram of an authority management system provided in one embodiment.

FIG. 3 is a block diagram of the authority management system 10 provided in one embodiment of the present disclosure. The authority management system 10 makes authority management more compatible and convenient.

In some embodiments, the authority management system 10 may run in a computing device. The authority management system 10 may include a plurality of function modules consisting of program code segments. The program code of each program code segment in the authority management system 10 may be stored in a storage device and executed by at least one processor to implement an authority management function.

In the embodiment, the authority management system 10 may be divided into a plurality of functional modules, according to the performed functions. The functional modules may include: an establishing module 101, a first determination module 102, a second determination module 103, and a generation module 104. A module as referred to in the present disclosure refers to a series of computer-readable instruction segments that can be executed by at least one processor and that are capable of performing fixed functions, which are stored in a storage device.

The establishing module 101 is configured to obtain registered biological image information, establish an identity information database according to the registered biological image information, and establish an authority information database, wherein authority information in the authority information database is associated with identity information in the identity information database.

The registered biological image information may include facial feature information and/or iris feature information.

Establishing the identity information database may include one or more of the following methods.

A first method of establishing the identity information database may include: obtaining facial images of persons in a preset area from a personal information database, identifying facial feature information of the persons using a facial recognition method, searching identity information of the persons in the personal information database, and storing the identity information corresponding to the facial feature information. The preset area may be a factory, an office building, a community, an industrial area, a city, or an entire country, etc. The personal information database may be an employee information database of a factory, a household information database of a community, a resident information database of a city, and the like.

A second method of establishing the identity information database may include: obtaining facial images of persons in a preset area from a personal information database, identifying iris feature information of the persons using an iris recognition method, searching identity information of the persons in the personal information database, and storing the identity information corresponding to the iris feature information.

A third method of establishing the identity information database may include: obtaining facial images of persons in a preset area captured by the facial image capturing device, obtaining registered information of the persons, extracting facial feature information of the persons from the facial images using a facial recognition method, searching identity information of the persons from the registered information, and storing the identity information corresponding to the facial feature information. The facial image capturing device may be a camera or a monitor located at a registration office, or a camera of a mobile phone or a notebook for online registration.

A fourth method of establishing the identity information database may include: obtaining iris images of persons in a preset area captured by the iris image capturing device, obtaining registered information of the persons, extracting iris feature information of the persons from the iris images using an iris recognition method, searching identity information of the persons from the registered information, and storing the identity information corresponding to the iris feature information.

Establishing the authority information database may include: querying authority information of the persons from the identity information database according to the identity information. The authority information may include: hardware authority information, software authority information, access point authority information, and signature authority information. The hardware authority information may include hardware name, allowed functions of hardware, and allowed usage time of hardware. The software authority information may include software name, allowed functions of software, and allowed usage time of software. The access point authority information may include access points (such as hotel lobby and hotel entrance), an allowed access time, etc. The signature authority information may include electronic signature documents, validity periods of electronic signatures, and so on.

Establishing the authority information database may further include: storing the authority information of the persons corresponding to the facial feature information and the iris feature information.

The first determination module 102 is configured to obtain biometric image information and an access request of a user, and determine whether there is certain identity information matching the biometric image information of the user in the identity information database.

In one embodiment of the present disclosure, the terminal 3 may receive an access request for using the terminal 3, capture an iris image of a user using an iris image capturing device located on the terminal 3, and send the access request and the iris image to the computing device 1. The terminal 3 may be a high-precision measuring device, a high-precision manufacturing device, a high-precision storage device, etc. The computing device 1 may perform some preprocessing to the iris image to obtain iris regions in the iris image. The preprocessing may include one or more of image filtering, edge detection, and interference detection. The computing device 1 may obtain iris feature information according to the iris regions using an iris pattern classification algorithm. The iris pattern classification algorithm may include any one of a classification algorithm based on wavelet transform, a classification algorithm based on discrete cosine transform, and an iris recognition algorithm based on independent component analysis.

In still another embodiment of the present disclosure, the terminal 3 may be a notebook computer. The notebook computer may capture a facial image of a user using a camera, receive, from the user as an administrator, an access request for using the notebook computer as a connection to a network, and send the access request and the facial image to the computing device 1. The computing device 1 may extract facial feature information from the facial image using an artificial intelligence (AI) facial recognition algorithm. The AI facial recognition algorithm may include, but is not limited to, facial recognition algorithms based on deep learnings and neural learning networks.

In yet another embodiment of the present disclosure, the terminal 3 may be a financial terminal, such as a multifunctional financial terminal. The terminal 3 may receive an access request for using the financial terminal from a user, capture a facial image of the user using a built-in camera, capture an iris image of the user using a built-in iris image capturing device, and send the access request, the facial image, and the iris image to the computing device 1. The computing device 1 may extract facial feature information from the facial image using an AI facial recognition algorithm, and iris feature information from the iris image using an iris pattern classification algorithm. The financial terminal may further receive an operation request from the user for performing financial operations on an account. Recognition both of the facial image and the iris image results in a more accurate authentication of the user.

If there is no certain identity information matching the biometric image information of the user in the identity information database, the first determination module 102 may generate a first prompt message. The first prompt message may be use to inform that the user is illegal. The first prompt message may be one or more of a text message, a voice message, and a warning bell message.

The second determination module 103 is configured to query certain authority information corresponding to the certain identity information from the authority information database upon a condition that there is the certain identity information matching the biometric image information of the user in the identity information database, and determine whether the access request is to be granted according to the certain authority information.

The authority information database may store a relationship between biometric information and authority information. According to the relationship between biometric information and authority information, a person with specific biometric information may have authority to access multiple terminals, various software, multiple access points, etc.

Determining whether the access request is to be granted according to the certain authority information may include: querying an allowed access time, allowed access positions, and allowed operations of the user from the authority information. The allowed access time denotes when a person is authorized to access an object. For example, when at least two persons use a same computer, each person may be authorized to use the computer for a specific usage time. The usage time of each user may be stored as the allowed access time of the person in the authority information. The allowed access positions denote where the person is authorized to access the object. For example, different areas in a factory may mean that each worker is authorized to enter one or more restricted areas. The allowed operations denote which operations the person is authorized to perform, whether an electronic device or a software application.

Determining whether the access request is to be granted according to the certain authority information may further include: determining whether a required access time in the access request is within the allowed access time of the user, determining whether a required access position in the access request is within the allowed access positions of the user, and determining whether a required operation in the access request is within the allowed operations of the user. If the required access time in the access request is within the allowed access time of the user, the required access position in the access request is within the allowed access positions of the user, and the required operation in the access request is within the allowed operations of the user, it may be determined that the access request is to be granted. The computing device 1 may compare the required access time with the allowed access time of the user, compare the required access position with the allowed access positions of the user, and compare the required operation with the allowed operations of the user. If at least one of the required access time, the required access position, and the required operation in the access request is not within what is allowed, it may be determined that the access request should not be granted.

If the access request is not to be granted, the second determination module 103 may generate a second prompt message. The second prompt message may be used to inform that the user has no authority to perform a specific operation required in the access request. The second prompt message may be one or more of a text message, a voice message, and a warning bell message.

The generation module 104 is configured to generate an operation instruction for performing a specific operation according to the access request upon a condition that the access request is to be granted.

The operation instruction may be one or more of an unlock instruction for unlocking a door, a startup instruction for starting an application software, a turn-on instruction for turning on an electronic device, a payment instruction for paying a bill, and a signature instruction for signing on an electronic document.

The operation instruction may be sent to the terminal 3 to control the terminal 3 to perform an operation. In one example, the operation instruction is an unlock instruction, the terminal 3 may unlock a door according to the unlock instruction.

In other embodiments of the present disclosure, the authority management system 10 may further include an updating module. The updating module is configured to determine whether there is a related operation associated with the specific operation. If there is a related operation associated with the specific operation, the updating module may update the authority information of the user in the authority information database to authorize the user to perform the related operation. Whether there is a related operation associated with the specific operation may be determined using a data association algorithm. In one example, when a person desires to open a safe in a bank, the person may submit a first access request for entering a room storing the safe, and a second access request for unlocking the safe. The second access request is determined to be associated to the first access request. In another example, a user may submit a third access request for opening a garage door, and a fourth access request for using a car in the garage. The fourth access request is determined to be associated to the third access request.

Embodiment of Computing Device

Figure 4:
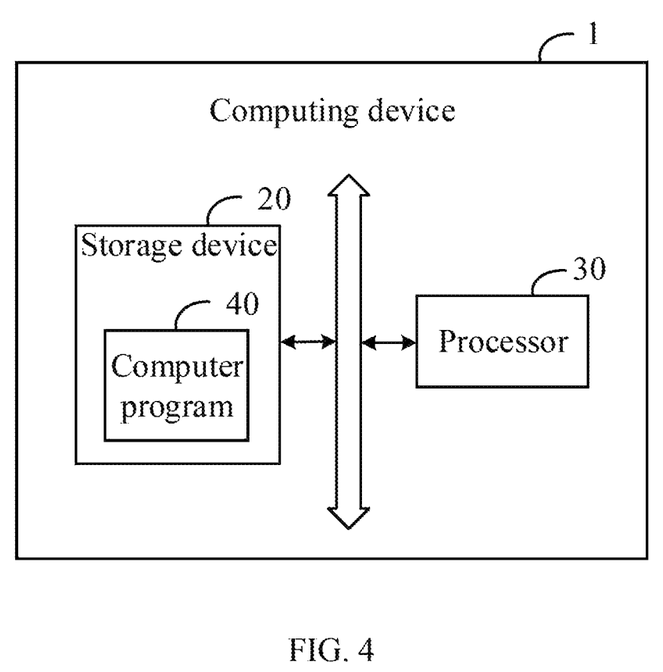
FIG. 4 is a block diagram of a computing device in one embodiment of the present disclosure.

FIG. 4 is one embodiment of a block diagram of the computing device 1 of the present disclosure.

The computing device 1 may include a storage device 20, a processor 30, and a computer program 40, such as an authority management program stored in the storage device 20 and executable by the processor 30. The processor 30 may execute the computer program 40 to implement the steps in the authority management method described above, such as the blocks S1 to S4 in FIG. 2. Alternatively, the processor 30 may execute the computer program 40 to implement the functions of the authority management system 10 described above, such as the modules 101 to 104 in FIG. 3.

In an exemplary embodiment, the computer program 40 may be divided into one or more modules/units, and the one or more modules/units are stored in the storage device 20 and executed by the processor 30 to complete the authority management method of the present disclosure. The one or more modules/units can be a series of computer-readable instruction segments capable of performing specific functions, and the instruction segments are used to describe execution processes of the computer program 40 in the computing device 1. In one example, the computer program 40 may be divided into the establishment module 101, the first determination module 102, the second determination module 103, and the generation module 104 in FIG. 3.

The computing device 1 may be a desktop computer, a notebook, a palmtop computer, or a cloud server. Those skilled in the art will understand that the block diagram is only an example of the computing device 1, and does not constitute a limitation on the computing device 1. Other examples of the computing device 1 may include more or fewer components than shown in FIG. 4, or combine some components or have different components. For example, the computing device 1 may further include an input/output device, a network access device, a bus, and the like.

The processor 30 may be a central processing unit (CPU) or other general-purpose processor, a digital signal processor (DSP), an application specific integrated circuit (ASIC), a Field-Programmable Gate Array (FPGA) or other programmable logic device, a discrete gate, or a transistor logic device, or a discrete hardware component, etc. The processor 30 may be a microprocessor or any conventional processor. The processor 30 may be a control center of the computing device 1, and connect various parts of the entire computing device 1 by using various interfaces and lines.

The storage device 20 may be configured to store the computer program 40 and/or modules/units. The processor 30 may run or execute the computer-readable instructions and/or modules/units stored in the storage device 20, and may invoke data stored in the storage device 20 to implement various functions of the computing device 1. The storage device 20 may include a program storage area and a data storage area. The program storage area may store an operating system, an application program required for at least one function (such as a sound playback function, an image playback function), etc. The data storage area may store data (such as audio data, or a phone book) created for using the computing device 1. In addition, the storage device 20 may include a random access memory, and may also include a non-transitory storage medium, such as a hard disk, an internal memory, a plug-in hard disk, a smart media card (SMC), and a secure digital (SD) card, a flash card, at least one disk storage device, a flash memory, or other non-transitory solid-state storage device.

When the modules/units integrated in the computing device 1 are implemented in the form of software functional units and used as independent units, they can be stored in a non-transitory readable storage medium. Based on this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the steps of the foregoing method embodiments. The computer-readable instructions include computer-readable instruction codes, and the computer-readable instruction codes can be source code, object code, an executable file, or in some intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

In several embodiments provided in the preset application, it should be understood that the disclosed computing device and method may be implemented in other ways. For example, the embodiment of the computing device described above is merely illustrative. For example, the units are only obtained by logical function divisions, and there may be other manners of division in actual implementation.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but do not signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

I claim:

1. An authority management method, comprising:
   obtaining registered biological image information, establishing an identity information database according to the registered biological image information, and establishing an authority information database, wherein authority information in the authority information database is associated with identity information in the identity information database;
   obtaining biometric image information and an access request of a user, and determining whether there is certain identity information matching the biometric image information of the user in the identity information database;
   querying certain authority information corresponding to the certain identity information from the authority information database upon a condition that there is the certain identity information matching the biometric image information of the user in the identity information database, and determining whether the access request is to be granted according to the certain authority information;
   generating an operation instruction for performing a specific operation according to the access request upon a condition that the access request is to be granted;
   determining whether a related operation is associated with the specific operation after performing the specific operation;
   updating the authority information of the user in the authority information database to authorize the user to perform the related operation, when the related operation is associated with the specific operation after performing the specific operation.

2. The authority management method of claim 1, further comprising:
   generating a first prompt message upon a condition that there is no certain identity information matching the biometric image information of the user in the identity information database.

3. The authority management method of claim 1, further comprising:
   generating a second prompt message upon a condition that the access request is not to be granted.

4. The authority management method of claim 1,
   wherein the specific operation comprises one or more of a startup instruction for starting an application software, a turn-on instruction for turning on an electronic device, a payment instruction for paying a bill, and a signature instruction for signing on an electronic document.

5. The authority management method of claim 1, wherein the registered biological image information comprises facial feature information and/or iris feature information, and
   a first method of establishing the identity information database comprises:
     obtaining facial images of persons in a preset area from a personal information database;
     identifying facial feature information of the persons using a facial recognition method;
     searching identity information of the persons in the personal information database; and
     storing the identity information corresponding to the facial feature information;
   a second method of establishing the identity information database comprises:
     obtaining facial images of persons in a preset area from a personal information database;
     identifying iris feature information of the persons using an iris recognition method;
     searching identity information of the persons in the personal information database; and
     storing the identity information corresponding to the iris feature information;
   a third method of establishing the identity information database comprises:
     obtaining facial images of persons in a preset area captured by a facial image capturing device, obtaining registered information of the persons;
     extracting facial feature information of the persons from the facial images using a facial recognition method;
     searching identity information of the persons from the registered information; and
     storing the identity information corresponding to the facial feature information;
   a fourth method of establishing the identity information database comprises:
     obtaining iris images of persons in a preset area captured by an iris image capturing device, obtaining registered information of the persons;
     extracting iris feature information of the persons from the iris images using an iris recognition method;

searching identity information of the persons from the registered information; and storing the identity information corresponding to the iris feature information.

6. The authority management method of claim 5, wherein establishing the authority information database comprises:

querying authority information of the persons from the identity information database according to the identity information, wherein the authority information comprises hardware authority information, software authority information, access point authority information, and signature authority information;

storing the authority information of the persons corresponding to the facial feature information and the iris feature information.

7. The authority management method of claim 1, wherein determining whether the access request is to be granted according to the certain authority information comprises:

querying an allowed access time, allowed access positions, and allowed operations of the user from the authority information;

determining whether a required access time in the access request is within the allowed access time of the user, determining whether a required access position in the access request is within the allowed access positions of the user, and determining whether a required operation in the access request is within the allowed operations of the user.

8. A computing device comprising a processor and a storage device, wherein the processor executes computer-readable instructions stored in the storage device to implement the following method:

obtaining registered biological image information, establishing an identity information database according to the registered biological image information, and establishing an authority information database, wherein authority information in the authority information database is associated with identity information in the identity information database;

obtaining biometric image information and an access request of a user, and determining whether there is certain identity information matching the biometric image information of the user in the identity information database;

querying certain authority information corresponding to the certain identity information from the authority information database upon a condition that there is the certain identity information matching the biometric image information of the user in the identity information database, and determining whether the access request is to be granted according to the certain authority information;

generating an operation instruction for performing a specific operation according to the access request upon a condition that the access request is to be granted;

determining whether a related operation is associated with the specific operation after performing the specific operation;

updating the authority information of the user in the authority information database to authorize the user to perform the related operation, when the related operation is associated with the specific operation after performing the specific operation.

9. The computing device of claim 8, wherein the method further comprises:

generating a first prompt message upon a condition that there is no certain identity information matching the biometric image information of the user in the identity information database.

10. The computing device of claim 8, wherein the method further comprises:

generating a second prompt message upon a condition that the access request is not to be granted.

11. The computing device of claim 8, wherein the specific operation comprises one or more of a startup instruction for starting an application software, a turn-on instruction for turning on an electronic device, a payment instruction for paying a bill, and a signature instruction for signing on an electronic document.

12. The computing device of claim 8, wherein the registered biological image information comprises facial feature information and/or iris feature information, and a first method of establishing the identity information database comprises:

obtaining facial images of persons in a preset area from a personal information database;

identifying facial feature information of the persons using a facial recognition method;

searching identity information of the persons in the personal information database; and storing the identity information corresponding to the facial feature information;

a second method of establishing the identity information database comprises:

obtaining facial images of persons in a preset area from a personal information database;

identifying iris feature information of the persons using an iris recognition method;

searching identity information of the persons in the personal information database; and storing the identity information corresponding to the iris feature information;

a third method of establishing the identity information database comprises:

obtaining facial images of persons in a preset area captured by a facial image capturing device, obtaining registered information of the persons;

extracting facial feature information of the persons from the facial images using a facial recognition method;

searching identity information of the persons from the registered information; and storing the identity information corresponding to the facial feature information;

a fourth method of establishing the identity information database comprises:

obtaining iris images of persons in a preset area captured by an iris image capturing device, obtaining registered information of the persons;

extracting iris feature information of the persons from the iris images using an iris recognition method;

searching identity information of the persons from the registered information; and storing the identity information corresponding to the iris feature information.

13. The computing device of claim 12, wherein establishing the authority information database comprises:

querying authority information of the persons from the identity information database according to the identity information, wherein the authority information comprises hardware authority information, software authority information, access point authority information, and signature authority information;
storing the authority information of the persons corresponding to the facial feature information and the iris feature information.

14. The computing device of claim 8, wherein determining whether the access request is to be granted according to the certain authority information comprises:
querying an allowed access time, allowed access positions, and allowed operations of the user from the authority information;
determining whether a required access time in the access request is within the allowed access time of the user, determining whether a required access position in the access request is within the allowed access positions of the user, and determining whether a required operation in the access request is within the allowed operations of the user.

15. A non-transitory storage medium having stored thereon computer-readable instructions that, when the computer-readable instructions are executed by a processor to implement the following method:
obtaining registered biological image information, establishing an identity information database according to the registered biological image information, and establishing an authority information database, wherein authority information in the authority information database is associated with identity information in the identity information database;
obtaining biometric image information and an access request of a user, and determining whether there is certain identity information matching the biometric image information of the user in the identity information database;
querying certain authority information corresponding to the certain identity information from the authority information database upon a condition that there is the certain identity information matching the biometric image information of the user in the identity information database, and determining whether the access request is to be granted according to the certain authority information;
generating an operation instruction for performing a specific operation according to the access request upon a condition that the access request is to be granted;
determining whether a related operation is associated with the specific operation after performing the specific operation;
updating the authority information of the user in the authority information database to authorize the user to perform the related operation, when the related operation is associated with the specific operation after performing the specific operation.

16. The non-transitory storage medium of claim 15, wherein the method further comprises:
generating a first prompt message upon a condition that there is no certain identity information matching the biometric image information of the user in the identity information database; and
generating a second prompt message upon a condition that the access request is not to be granted.

17. The non-transitory storage medium of claim 15, wherein
the specific operation comprises one or more of a startup instruction for starting an application software, a turn-on instruction for turning on an electronic device, a payment instruction for paying a bill, and a signature instruction for signing on an electronic document.

18. The non-transitory storage medium of claim 15, wherein the registered biological image information comprises facial feature information and/or iris feature information, and
a first method of establishing the identity information database comprises:
obtaining facial images of persons in a preset area from a personal information database;
identifying facial feature information of the persons using a facial recognition method;
searching identity information of the persons in the personal information database; and
storing the identity information corresponding to the facial feature information;
a second method of establishing the identity information database comprises:
obtaining facial images of persons in a preset area from a personal information database;
identifying iris feature information of the persons using an iris recognition method;
searching identity information of the persons in the personal information database; and
storing the identity information corresponding to the iris feature information;
a third method of establishing the identity information database comprises:
obtaining facial images of persons in a preset area captured by a facial image capturing device, obtaining registered information of the persons;
extracting facial feature information of the persons from the facial images using a facial recognition method;
searching identity information of the persons from the registered information; and
storing the identity information corresponding to the facial feature information;
a fourth method of establishing the identity information database comprises:
obtaining iris images of persons in a preset area captured by an iris image capturing device, obtaining registered information of the persons;
extracting iris feature information of the persons from the iris images using an iris recognition method;
searching identity information of the persons from the registered information; and
storing the identity information corresponding to the iris feature information.

19. The non-transitory storage medium of claim 18, wherein establishing the authority information database comprises:
querying authority information of the persons from the identity information database according to the identity information, wherein the authority information comprises hardware authority information, software authority information, access point authority information, and signature authority information;
storing the authority information of the persons corresponding to the facial feature information and the iris feature information.

20. The non-transitory storage medium of claim 15, wherein determining whether the access request is to be granted according to the certain authority information comprises:

querying an allowed access time, allowed access positions, and allowed operations of the user from the authority information;

determining whether a required access time in the access request is within the allowed access time of the user, determining whether a required access position in the access request is within the allowed access positions of the user, and determining whether a required operation in the access request is within the allowed operations of the user.

\* \* \* \* \*